United States Patent [19]

Mercier

[11] 4,248,269
[45] Feb. 3, 1981

[54] ADJUSTABLE FLOW PULSE DAMPENER

[75] Inventor: Jacques H. Mercier, Paris, France

[73] Assignee: Normand Trust, New York, N.Y.

[21] Appl. No.: 66,817

[22] Filed: Aug. 15, 1979

[51] Int. Cl.³ .............................................. F16L 55/00
[52] U.S. Cl. .......................................... 138/30; 138/39
[58] Field of Search ............................. 138/26, 30, 39; 220/85 B

[56] References Cited

U.S. PATENT DOCUMENTS

| 3,782,418 | 1/1974 | Zahid | 138/26 |
| 3,857,413 | 12/1974 | Zahid | 138/30 X |
| 3,868,972 | 3/1975 | Zirps | 138/30 |
| 4,069,844 | 1/1978 | Zahid | 138/30 |
| 4,134,429 | 1/1979 | Zahid | 138/30 |

*Primary Examiner*—James E. Bryant, III
*Attorney, Agent, or Firm*—Arthur B. Colvin

[57] ABSTRACT

A pulse dampener device in which the effective cross section of the flow path through the dampener assembly may readily be varied thereby enabling the device to be adjusted or tuned to deal most effectively with any of a variety of pulse variables encountered in a particular installation.

4 Claims, 4 Drawing Figures

ADJUSTABLE FLOW PULSE DAMPENER

BACKGROUND OF THE INVENTION

1. Field of the Invention

The present invention is in the field of pressurized pulse dampener devices of the type conventionally interposed in hydraulic systems to minimize the transmission of pulses downstream of the dampener.

2. The Prior Art

It is conventional to employ in a hydraulic system or the like a pulsation dampener device, the function of which is to reduce the deleterious effects of pulses within the system. By way of example, U.S. Pat. Nos. 3,782,418, 3,857,413 and 4,069,844 constitute patents directed to pulse dampener devices of the type generally referred to hereinabove.

Such devices typically include a pressure vessel divided into two chambers by a movable boundary, such as a bladder. One chamber is charged with a gas under pressure. The other chamber is in communication with the hydraulic system. When pulses in the hydraulic fluid occur, which pulses may be the result of the use of reciprocating piston pumps, etc., energy is stored by compression of the gas within the gas chamber and released to the hydraulic system when the pressure falls in the hydraulic system, whereby the amplitude of such pulses transmitted to the remainder of the system is greatly reduced. In the absence of such dampening devices, the shocks created by the pulses may be severe enough to damage or rupture other elements of the hydraulic system, the problem being compounded by harmonic effects which may magnify the effect of the pulses generated.

Since harmonic effects, frequency, and amplitude of pulses generated in each environment vary from installation to installation, it will be appreciated that no single dampening device can effect optimal dampening in all cases. To adapt to varying conditions it has heretofore been necessary to provide a relatively wide range of dampener assemblies having differing dampening characteristics, and, in many instances, to experimentally employ a number of such devices on a trial and error basis in a particular installation to ascertain which unit is most effective in view of the parameters encountered.

SUMMARY OF THE INVENTION

The present invention may be summarized as directed to a pulse dampener device adapted to be adjusted to enable a degree of tuning of the dampener to a particular set of conditions whereby the range of dampener devices required may be limited.

More particularly, the apparatus comprises a pressure vessel having a resilient bladder disposed therein dividing the vessel into two chambers, namely, a gas chamber and an oil chamber. The pressure vessel is mounted to a housing having fittings for interposition within the hydraulic line of a system to be damped. A throughgoing bore is formed in the housing, which bore incorporates a central baffle or deflector which guides the hydraulic fluid medium in a direction effective to direct a substantial proportion of the fluid into the oil port and thus effect energy transfer to the gaseous medium.

The device is characterized by the provision of a hollow sleeve in the housing, which sleeve is provided with diametrically opposed apertures adapted, in a first position, to register with the bore or, alternatively, to be adjustably shiftable into partially registering position with the bore, whereby the effective cross-sectional area of the throughgoing flow path may be modified. In this manner, by adjusting the offset between the sleeve apertures and bore, the dampening characteristics of the device may be modified or tuned most efectively to cope with the requirements of a given installation.

It is accordingly an object of the invention to provide an improved pulse dampener device of novel construction wherein the flow of hydraulic fluid through the device may be readily regulated in order to provide a dampening function as desired.

A further object of the invention is the provision of a device of the type described which is of inexpensive and durable construction.

Still a further object of the invention is the provision of a device of the type described including a housing having a bore, a pressure vessel adapted to be mounted to the housing and a hollow sleeve spanning the junction between the housing and the pressure vessel, the sleeve including diametrically opposed apertures selectively shiftable between fully registering and a variety of partially registering positions with the bore of the housing, thereby to provide a regulated flow path for hydraulic fluid.

Still a further object of the invention is the provision of a device of the type described wherein the sleeve functions to maintain the components in the desired assembled condition To attain these objects and such further objects as may appear herein or be hereinafter pointed out, reference is made to the accompanying drawings, forming a part hereof, in which.

Figure 1:
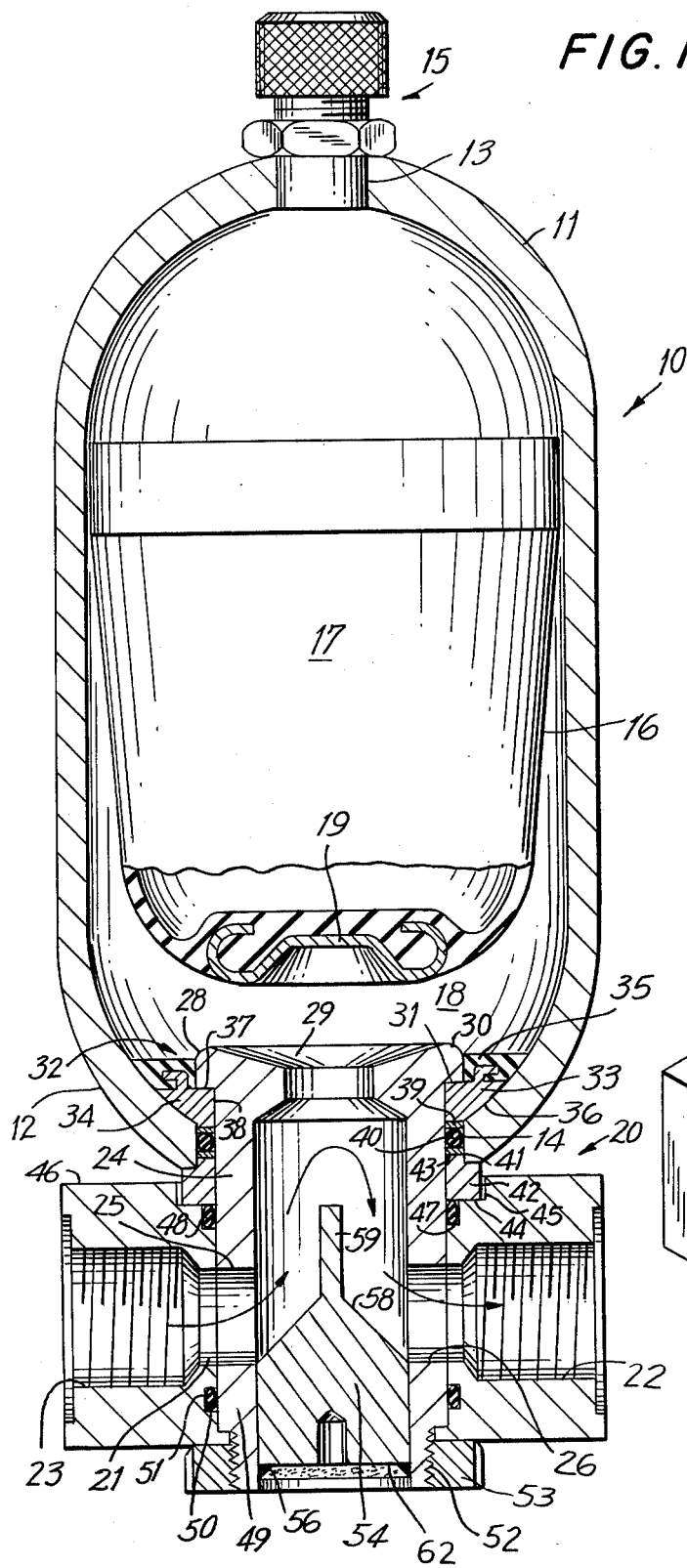
FIG. 1 is a vertical sectional view through a dampener device in accordance with the invention.
Figure 2:
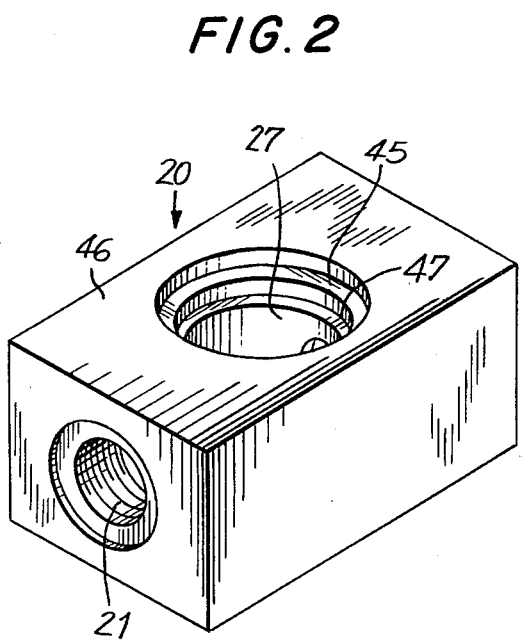
FIG. 2 is a perspective view of the housing components thereof.

Referring now to the drawings, the device in accordance with the invention comprises a pressure vessel 10, generally in the form of a cylindrical member having hemispherical upper and lower ends 11, 12, respectively. A gas charging port 13 is formed at the upper end and an oil port 14 is formed at the lower end of the pressure vessel. As is conventional, the gas charging valve assembly is mounted in the gas charging port 13.

A bladder assembly 16 is disposed within the pressure vessel, the bladder assembly dividing the interior of the vessel into an upper chamber 17 in communication with the gas charging port 13 and a lower chamber 18 in communication with the oil port 14. The partition or bladder 16 may include a metal button or valve plate 19 molded or bonded into the material of the bladder.

The device includes a housing 20 which may take the form of a rectangular metallic block having a throughgoing bore 21 formed therein, the terminal ends of the bore defining threaded attachment fixtures 22, 23, enabling the housing to be interposed within the pressure line of a hydraulic system.

The pressure vessel 10 is secured to the housing 20 by an attachment sleeve 24. The sleeve 24, which is generally cylindrical and hollow, includes diametrically opposed flow apertures 25, 26 which are directed transversely to the longitudinal axis of the sleeve 24. The sleeve 24 is received within the vertically directed bore 27 formed in the housing 20, the bore 27 being in alignment with the major axis of the pressure vessel 10.

The sleeve 24, at its upper end 28, includes a beveled valve seat 29 shaped to be complementally engaged by the button or valve member 19 carried by the bladder. The sleeve, adjacent the valve seat 29, is provided with a radially extending flange 30 having a downwardly directed annular retainer shoulder 31. The sleeve is secured in the oil port 14 by a mounting assembly 32 which, illustratively, may be manufactured in accordance with the construction of U.S. Pat. Nos. 3,782,418 and/or 3,439,712.

Briefly, the mounting assembly 32 may be comprised of a pair of metallic mounting segments 33, 34, each being arcuate and of an angular extent of substantially 180°.

The segments 33, 34 are bonded to a continuous elastomeric ring 35 whereby the assembly 32 may be folded about the junction line of the arcuate segments and passed into the interior of the pressure vessel through the oil port 14 whereat, upon release of the device from the folded condition, the same will spring to its annular configuration.

The arcuate segments 33, 34 include downwardly directed curved edges which closely engage the annular surface 36 surrounding the oil port. The segments including an upwardly facing annular shoulder 37 of lesser diameter than the diameter of the downwardly directed shoulder 31 of the sleeve, whereby when the parts are positioned as shown in FIG. 1, the shoulder 31 of the sleeve bears against upwardly facing shoulder 37 of the arcuate segments, which in turn bear against the surface 36 surrounding the oil port 14. The inner diameter 38 defined by the arcuate segments 33, 34 of the mounting assembly is sized closely to embrace the outer diameter of the sleeve 24.

In order to effect a fluid-tight seal between the sleeve and the oil port, there is provided an upper washer 39, an O ring 40 and a lower compression washer 41. The annular collar member 42 is disposed between the compression washer 41, and the housing 20. The collar 42 includes a reduced diameter portion 43 which extends upwardly into the annular space defined between the oil port 14 and the outer diameter of the sleeve 24.

The collar 42 includes an enlarged annular base portion 44 which lies within an annular recess 45 formed at the upper edge 46 of the housing. An O ring retainer channel 47 may be disposed beneath the recess 45 for the reception of a further O ring 48. A seal is effected between the lower end 49 of the sleeve 24 and the housing 20 by a lower O ring 50 mounted in annular groove 51 formed in the housing. The external portion of the lower end 49 of the sleeve 24 is threaded, as at 52, for the reception of a clamp nut 53.

Figure 4:
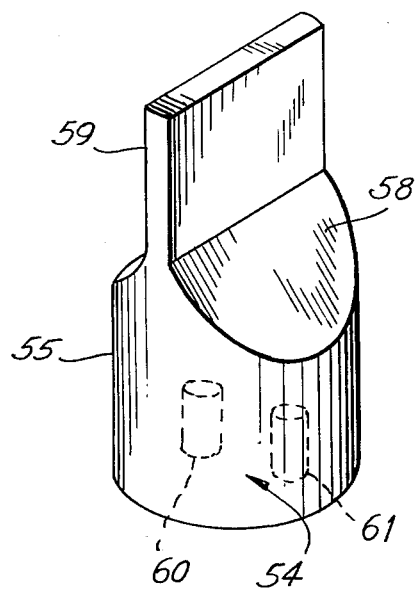
FIG. 4 is a perspective view of the baffle member.

A baffle assembly 54, best seen in FIG. 4, is mounted within the lower end 49 of the sleeve. The baffle assembly includes a cylindrical shank portion 55 secured as by an annular weld line 56 within the sleeve. The baffle assembly 54 includes inclined deflector portions 57, 58 and upwardly directed partition portion 59. As best seen from FIG. 1, the deflector portions 57, 58 are disposed essentially at the height of the apertures 25, 26 in the sleeve 24, and the partition member 59 projects above the apertures.

As will be understood from FIG. 1, when the clamp nut 53 is tightened, the sleeve is drawn downwardly so that a clamping connection is effected between the housing 20 and the pressure vessel 10, the interfaces between the housing, sleeve and pressure vessel being, in all instances sealed by the O rings interposed between the noted parts.

In the aspect of FIG. 1 it will be seen that the apertures 25, 26 of the sleeve 24 are essentially aligned with the through-going bore 21 formed in the housing, affording the greatest possible flow path from input fixture 23 to output fixture 22. As illustrated by the flow arrows shown in FIG. 1, hydraulic fluid flowing through fixture 23 to fixture 22 will take a circuitous path as dictated by the deflector portions 57, 58 and partitions 59. Where it is desired to throttle the flow through the housing, it is merely necessary to back off the clamp nut 53, thus loosening the connection between the pressure vessel 10 and housing 20, and partially rotate the sleeve 24 within the housing. Such rotary movement may be conveniently effected through the use of a spanner wrench (not shown) inserted in wrench receiver bores 60, 61 in the exposed under face 62 of the shank 55 of the baffle assembly.

Figure 3:
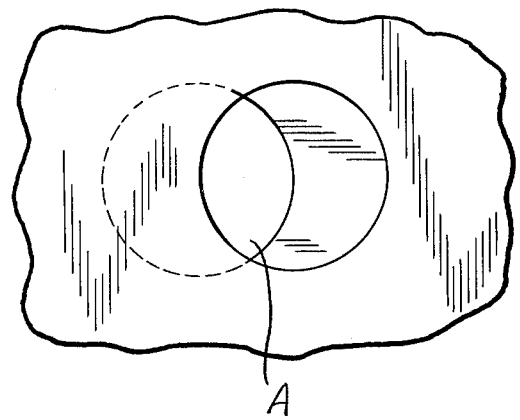
FIG. 3 is a magnified fragmentary sectional view showing the parts in a partially overlapped or throttled position.

As shown in FIG. 3, the sleeve has been partially rotated to offset the apertures 25, 26 from the bore 21, whereby a restricted flow area A is defined across the housing. When the desired restricted flow position is achieved, clamp nut 53 is again tightened, locking the parts as hereinabove set forth.

It will be observed that the effective cross-section A through the housing may be infinitely varied in accordance with the relatively offset positions of the apertures 25, 26 and the bore 21.

The operation of the device will be evident from the preceding description.

When the pressure at the oil port 14 is less than the internal pressure within the gas chamber 17, the valve member 19 will be seated against the valve seat 29. Upon pressure within the hydraulic line exceeding the pressure in the gas chamber 17, hydraulic fluid is directed upwardly into the oil chamber 18, unseating the valve and further compressing the gas in the chamber 17, whereby energy is transferred to the gas. When the pressure in the hydraulic line drops below the pressure in the gas chamber 17, the partition will expand, returning energy to the hydraulic fluid, the constant depletion and restoration of energy functioning to dampen pulses in the fluid emerging from fixture 22.

The provision of a variable flow path enables "tuning" of the dampener device in accordance with the pulsations encountered in a given application. By way of example, where the primary pulsations encountered are of high frequency and low amplitude, the same may be more effectively damped by reducing the flow path through relative rotation out of registry of the aperture 25, 26 and bore 21. Conversely, where the pulses encountered are of lower frequency but high amplitude, most effective damping may be achieved by providing a maximum flow path across the dampener device as a result of rotation of the apertures in the sleeve into full registry with the bore 21.

Numerous variations of a structural nature may be made in the device as hereinabove described without departing from the spirit of the present invention. Accordingly, the invention is to be broadly construed within the scope of the appended claims.

Having thus described the invention and illustrated its use, what is claimed as new and is desired to be secured by Letters Patent is:

1. An adjustable flow pulse dampener device comprising, in combination, a pressure vessel having a gas charging port at one end and an oil port at the other end, a housing mounted at said other end of said vessel, said housing including walls defining a bore forming a through-going flow passage, connector fitting means at the terminal ends of said flow passage for interposing said passage into the fluid flow path of a hydraulic circuit, a gas charging valve mounted in said gas port, a resilient, expansible partition mounted in said vessel and dividing the same into two chambers in communication respectively with said oil port and said gas port, a hollow cylindrical sleeve member mounted in said housing and extending into said pressure vessel through said oil port, the upper end of said cylindrical sleeve member defining a valve seat, said cylindrical sleeve member having its axis aligned with the major axis of said vessel and being rotatable relative to said vessel, valve means on said partition shiftable into sealing position of said valve seat responsive to expansion of said partition, said cylindrical sleeve member including a diametrically opposed pair of apertures extending therethrough, said apertures being disposed in registry with said bore in said housing, baffle means mounted in said cylindrical sleeve member between said apertures for precluding direct fluid flow from one said apertures to the other, and means for adjustably rotating said cylindrical sleeve member relative to said housing thereby partially to offset said aperture from said bore thereby to restrict the fluid flow path from one said fitting to the other, the end of said cylindrical sleeve member remote from said oil port extending outwardly beyond said housing, said outwardly extending portion of said cylindrical sleeve member including an external thread portion, and clamp nut means threadedly connected to said extending end of said cylindrical sleeve members and engaging said housing for locking said sleeve in a selected rotated position relative to said housing.

2. A pulse dampener device in accordance with claim 1 wherein said cylindrical sleeve member includes an annular shoulder adjacent said valve seat, and said pressure vessel includes an annular collar portion disposed therein, said collar having an enlarged outer diameter portion engaging the interior of said pressure vessel surrounding said oil port, and a reduced diameter aperture surrounding said cylindrical sleeve member, said shoulder of said cylindrical sleeve member overlying said collar, said cylindrical sleeve member being clampingly retained in said oil port by engagement of said shoulder and collar at one end, and by engagement of said clamp nut and housing at the other end.

3. Apparatus in accordance with claim 2 wherein said baffle member includes a cylindrical shank portion disposed within and weldingly connected to said cylindrical sleeve member about an annular weld line adjacent said outwardly extending end of said cylindrical sleeve member thereby to seal said outwardly extending end of said cylindrical sleeve member.

4. Apparatus in accordance with claim 3 wherein the end of said shank portion of said baffle member is exposed through said outwardly extending end of said cylindrical sleeve member, said end of said shank including socket means adapted to be engaged by a wrench for rotation of said shank and, hence, said cylindrical sleeve member.

* * * * *